2,779,753

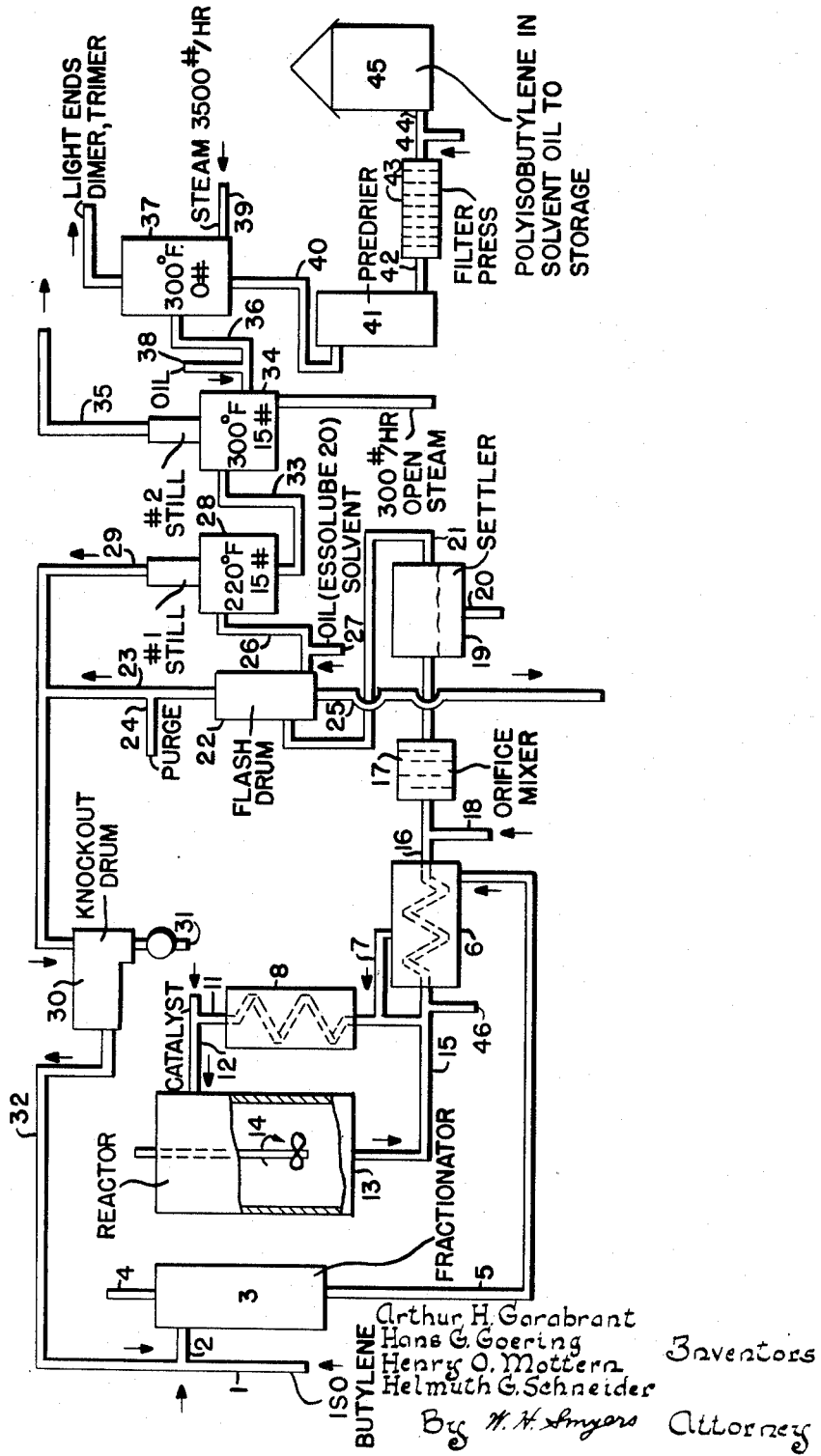

PROCESS FOR PREPARING HIGH MOLECULAR POLYMERS FROM ISOBUTYLENE

Arthur R. Garabrant and Helmuth G. Schneider, Westfield, Hans G. Goering, Elizabeth, and Henry O. Mottern, Bloomfield, N. J., assignors to Esso Research and Engineering Company, a corporation of Delaware Application December 29, 1952, Serial No. 328,358

12 Claims. (Cl. 260—94.8)

This invention relates to the polymerization of isobutylene with metal halide catalysts and more particularly relates to a method for preparing higher molecular weight polymers at a given temperature which are stable against shear breakdown in oil.

It is well known that isobutylene can be polymerized with metal halide catalysts to prepare low molecular weight polymers. In these prior art processes it has been the practice to employ as the feed refinery streams containing only a relatively small amount of isobutylene and containing still smaller amounts of impurities such as butene-1 and butene-2. It has also been proposed to employ diluents in the reaction vessel such as propane or butane when using an isobutylene feed. Although it is known that the molecular weight of the polymer increases with lower temperatures, it has not been practical to operate at temperatures below $-50°$ F. because of the tendency of the polymer to precipitate causing fouling of the reactor and occlusion of the catalyst, thus rendering the reaction difficult to control. In the absence of any solvent, restrictions exist on the molecular weight of the polymer which can be obtained at a given bulk temperature. The high viscosity of polyisobutylene-isobutylene systems at or above moderate conversion levels is conducive to conditions of poor heat transfer to the reactor walls when external cooling is used to maintain the polymerization temperature. To a limited extent it is possible to improve heat transfer by increasing the degree of agitation but at high conversion levels and high conversion rates (high rates of heat release) it becomes necessary to reduce the temperature of the external refrigerant in order to prevent an increase in polymerization temperature. The reduction of the temperature of the external cooling results in increased refrigeration costs.

Furthermore, polyisobutenes prepared in the past by bulk polymerization techniques, using either solid or solvated Friedel-Crafts type catalysts, have exhibited a tendency to lose thickening power and viscosity index potency in oil solutions when subjected to high rates of shearing stress. This tendency to lose thickening power and viscosity index potency in oil solutions (breakdown) increases with increasing thickening power (molecular weight) of the polyisobutene, and as a result has limited the molecular weight of the polymer that can be used as a motor oil additive. Limiting the molecular weight of the polymer necessitates the use of higher polymer concentration in the oil solution in order to reach a given thickening effect and viscosity index potency.

The ability of a polymer to resist breakdown is measured by the loss in viscosity of an oil solution of the polymer after circulation through a close tolerance gear pump under standard conditions. The loss in viscosity after circulation divided by the increase in viscosity of the polymer-oil blend due to the thickening effect of the polymer added is defined as breakdown. The lower the breakdown the more shear stable the polymer. The relationship between the shear stability of a polymer and its molecular weight or thickening power is known as the shear stability-molecular weight relationship. One polymer is said to have an improved shear stability-molecular weight relationship over another polymer of the same molecular weight if the first polymer shows lower breakdown than does the second polymer. Conversely, a polymer would have an improved or superior shear stability-molecular weight relationship if it had a higher molecular weight than did a second polymer having the same breakdown.

It is, therefore, one object of this invention to provide means for obtaining a polymer having a higher molecular weight for a given reaction temperature.

Another object of the invention is to provide a process for the production of polyisobutene having an improved shear stability-molecular weight relationship.

These and other objects of this invention are accomplished by carrying out the polymerization of isobutylene in the presence of a solvent for the polymer and the controlling of the amount of this solvent so that a polymer having the proper shear stability-molecular weight relationship is obtained. The polymerization reaction is preferably, although not in all cases, carried out at temperatures below atmospheric. Generally, temperatures excessively below atmospheric are of no particular benefit. Ordinarily temperatures are employed within the range $-112°$ F. to $+104°$ F.

Catalysts suitable for the polymerization reaction according to this invention include solid catalysts of the Friedel-Crafts type, such as aluminum chloride, aluminum bromide, titanium tetrachloride, uranium chloride, zirconium tetrachloride and the like. The catalyst is added in small quantities, slightly in excess of that needed to initiate the reaction. The reaction may be carried out in any desired manner so long as a large excess catalyst is not used.

The catalyst is best employed in the solid form but it may also be used as a solution in a solvent which forms no complex with the catalyst and is liquid at the reaction temperature. Suitable solvents are the alkyl halides such as methyl and ethyl chlorides and saturated hydrocarbons if the Friedel-Crafts catalyst is soluble therein. When the catalyst is used in the solid form the amount may vary between 0.01 and 2.0% by weight of isobutylene in the feed.

When a dissolved catalyst is used, the amount of catalyst added is much smaller since the catalyst is much more efficient. In this case the range is between 0.005 and 1.0% by weight of the isobutylene in the feed.

Suitable solvents for the polymer, in accordance with this invention, include normally liquid alkane hydrocarbons such as pentane, isopentane, hexane, isohexanes, heptane, isoheptanes, octane, isooctanes, etc. and alkyl halides, such as carbon tetrachloride, chloroform, and the corresponding bromine, iodine and fluorine compounds which dissolve the polymer. Other solvents such as carbon disulfide may also be used. Any non-polar material which does not form a complex with the catalyst, which is liquid at the reaction temperature and in which the polymer is soluble, is suitable. Lower molecular weight hydrocarbons such as propane and butane are not suitable because they have a tendency to precipitate the polymer.

These solvents are employed to reduce fouling for a given degree of agitation or to minimize the degree of agitation necessary to prevent fouling. They are also used to prevent the precipitation of the polymer from the reactor solution at temperatures below $-50°$ F. The inert diluent is also used to obtain marked improvements in the molecular weight of the polymer without decreasing the reactor temperature. As high as 70% increase in polymer molecular weight can be obtained over polymer made in non-diluent systems by using 25% of the diluent at the same polymerization temperature.

The process of polymerizing isobutene to polyisobutene with solid metal halides requires the use of violent agitation in the reaction zone to keep the catalyst suspended in the reactor liquor. Also, the individual catalyst particles become coated with the polymer produced and tend to coalesce into large masses of catalyst which will settle out of the reaction zone and adhere to the walls of the reactor unless constantly broken up by agitation and shear gradients throughout the reaction zone. The use of a polymer solvent, which does not react with the aluminum chloride, to dissolve the polymer from around the catalyst particles eliminates the agglomeration of catalyst to a high degree.

It is known that the molecular weight of polyisobutylene increases with decreasing polymerization temperatures. Molecular weight of the polymer may thereby be controlled by the control of the polymerization temperature. However, at −50° F. or lower the polymer produced is only partially soluble in the unreacted monomer and precipitation of the polymer occurs. The lower the temperature the less highly solvated is the precipitated polymer. The precipitation of polymer is undesirable as it removes the catalyst from the reaction zone with consequent decrease in the reaction rate. In addition precipitated polymer may collect on moving parts of the agitator system and cause vibration severe enough to necessitate stopping the agitation. These disadvantages to polymerizing at temperatures below −50° F. are completely eliminated by the use of a polymer solvent.

The use of a polymer solvent also results in a substantial increase in polymer molecular weight over and above that for polymer made without solvent at the same temperature. The reason for this unexpected result is probably the following: The solubility relationship of polyisobutylene in isobutylene is such that a considerable film of polymer exists on the catalyst surface. The poor thermal conductivity of this film retards dissipation of the heat of reaction. As a result, the temperature of the catalyst surface is believed to be higher than the bulk temperature of the liquid in the reaction zone. Use of a polymer solvent in the reactor liquor will reduce the resistance to heat transfer and keep the catalyst surface cooler for a given bulk temperature of the reactor liquor. This cooling of the catalyst surface increases the molecular weight of the polymer made with solvent over those polymerizations made without solvent at the same bulk temperature.

Furthermore, in accordance with this invention it has been found that for polymers of equal molecular weights, the amount of shear breakdown is inversely proportional to the concentration of the polymer solvent in the polymerization mixture and independent of the concentration of unreacted monomer in the polymerization mixture. While it is not intended to limit the present invention by virtue of any theory constructed to aid in the understanding of the invention, it is believed that the reason for this unexpected result may be the following: The solubility of polybutene in isobutene is such that a considerable film of polymer exists on the catalyst surface. The poor thermal conductivity of this film retards the dissipation of the heat of reaction thus producing localized areas of localized high temperature on the catalyst interface. These areas of higher temperature result in the formation of low molecular weight polybutenes which when mixed with the higher molecular weight polymers produced in the cooler polymerization zones result in the formation of a polymer of wide molecular weight distribution and low average molecular weight. The higher molecular weight fractions of these polymers undergo rapid breakdown when subjected to shearing stresses with consequent loss of thickening power. The use of a polymer solvent increases the rate of heat transfer and keeps the catalyst interface at a more uniform temperature thus producing a polybutene of narrower molecular weight distribution and higher average molecular weight. The absence of high molecular weight fractions in the polymer reduces its tendency to undergo breakdown when subjected to shearing stresses.

The amount of diluent used to give the above-described advantages is such that when mixed with the isobutylene feed the isobutylene is below 75% of the total mixture. In other words, there should be from 25–95% of solvent present based on total feed including solvent.

It is also a particular feature of this invention that all of the above advantages can be secured in an optimum manner when employing finely divided solid aluminum chloride. It is desirable that the aluminum chloride particles be finer than 60 mesh, i. e. the particle diameter should be finer than 0.2 mm.

The manner in which the present invention is carried out will be fully understood from the following description when read with reference to the accompanying drawing.

A mixture of hexane and pure isobutylene in line 1 is mixed with recycled isobutylene and hexane in line 32 to give substantially a 70% hexane-30% isobutylene mixture. The recycle isobutylene, however, contains a small amount of water and about 0.02% isopropyl alcohol as contaminants. These are introduced by line 2 into azeotropic distillation tower 3 where the alcohol and water are removed overhead through line 4 as azeotropes with a small amount of the hydrocarbons. Pure, dry isobutylene-hexane mixture is withdrawn through line 5 and passed through heat exchanger 6 and line 7 to cooler 8, where it is cooled to substantially the polymerization temperature, e. g. −40° F. From cooler 8 it is passed by line 11 to catalyst line 12, where it meets finely divided aluminum chloride. The catalyst may be introduced in any known manner as by jet or star feeder or the like. This mixture is then introduced into reaction chamber 13 at a rate of about 100 gallons of feed per hour per pound of catalyst and is agitated by stirrer 14 so that the catalyst is maintained in suspension. Alternately it is possible to add the catalyst directly to the reactor.

Polymer, as it is formed, dissolves in the large excess of hexane present in the reactor and is thus prevented from depositing on the surface of the reaction vessel. The solution of polymer in hexane is withdrawn as a slurry with aluminum chloride through line 15. Alcohol is added to the slurry in line 15 by means of line 46 and the resulting mixture is passed through heat exchanger 6, where it cools incoming feed. The heated polymer solution leaves the heat exchanger by line 16 and is contacted in orifice mixer 17 with a mixture of dilute caustic introduced through line 18 to kill the catalyst. This forms aluminum hydroxide and neutralization salts which are settled out in settler 19, where two layers are formed, an upper layer consisting of a solution of polymer in hexane and a lower layer of dilute caustic containing aluminum hydroxide and neutralization salts. The bottom layer is withdrawn through line 20 and the upper layer is passed by line 21 to flash drum 22, where the lower boiling materials are flashed off through line 23. A purge stream may be withdrawn through line 24, if desired. A polyisobutylene product having a molecular weight in the range of 10,000 to 20,000 or even up to 50,000 is withdrawn from the bottom of flash drum 22 through line 25.

A solution of isobutylene polymer in hexane is withdrawn as a side stream from flash drum 22 by line 26. A lubricating oil such as Essolube 20 is added to this stream through line 27 as a heavy carrier oil for the polymer. This mixture is passed to still 28, where it is distilled at a temperature of 220° F. under a pressure of 15 lbs. per sq. in. gage. A stream containing approximately 13% isobutylene and approximately 85% hexane is withdrawn from the still through line 29, combined with the overhead from flash drum 22 and passed into knockout drum 30, where any water present in this stream is settled out and removed through line 31. The substantially dry mixture of isobutylene and hexane is recycled to distillation tower 3 by line 32 and line 2.

Bottoms from still 28 are passed by line 33 to a second still 34 operating at 300° F. under a pressure of 15 lbs. per sq. in. gage. This still removes the last traces of isobutylene and the remainder of the hexane from the solution of polymer in oil. The overhead withdrawn by line 35 from the top of still 34 contains about 7.0% isobutylene 85% hexane, and the remainder water and other minor constituents. Bottoms from still 34 are withdrawn by line 36 and passed to a third still 37. Additional oil may be added by line 38, if desired. Still 37 is operated at atmospheric pressure and 300° F. to give an overhead stream containing any dimer and trimer present. Dry steam is admitted through line 39 to the base of still 37 to facilitate stripping off the light ends. Bottoms from still 37 are passed by line 40 to air drier 41 to remove any remaining moisture. The dried oil-polymer solution is then passed by line 42 to filter press 43 to remove any remaining aluminum hydroxide and neutralization salts. The finished solution of polybutene in oil is then passed by line 44 to storage tank 45.

The advantages of the invention will be better understood from a consideration of the following experimental data which are given for the sake of illustration, but without intention of limiting the invention thereto.

EXAMPLE 1

Ten grams of commercial sublimed aluminum chloride powder were charged to a 12 mm. internal diameter, 1 ft. long glass tube and carefully elutriated with carbon dioxide gas. Finely divided aluminum chloride particles, amounting to 3.2 gms., were collected overhead in a small Ehrlenmeyer flask. This material had a particle size diameter of under 0.2 mm. and was added to a charge consisting of 420 grams of isobutene diluted with 980 gms. of commercial hexane and the mixture polymerized at −40° F. in a 5-liter, round bottom glass reactor, equipped with an agitator and surrounded with a Dry-Ice alcohol cooling bath. This experiment was duplicated using 3.2 gms. of the coarser catalyst particles left in the elutriator. The following data were obtained:

*Effect of AlCl₃ particle size on catalyst activity and product quality*

| Reaction Time, Min. | Reaction Temp., °F. | Wt. Isobutene, gms. | AlCl₃ Particle Diam. app., mm. | Wt. AlCl₃ Used, gms. | Poly. Yield, gms. | Conv. Rate,[1] Units | Cat. Eff.,[2] Units | Polymer M. W. (Staud.) |
|---|---|---|---|---|---|---|---|---|
| 18 | −39 | 420 | finer than 0.2 | 3.2 | 143.0 | 1.89 | 149 | 26,600 |
| 18 | −40 | 420 | 0.2 to 0.8+ | 3.2 | 7.4 | 0.10 | 7.7 | 25,400 |

[1] Percent isobutylene conversion to polymer minute.
[2] Gms. polymer/gram AlCl₃ per hour.

From the above data it is evident that aluminum chloride having a particle size of less than 0.2 mm. exhibits almost twenty times the catalytic activity of that having a particle size in the range of 0.2 to 0.8 mm.

EXAMPLE 2

Twenty grams of commercial sublimed aluminum chloride powder were charged to a 12 mm. internal diameter, 1 ft. long glass tube and carefully fractionated with nitrogen gas into four equal fractions having the following particle size:

Fraction I _____ 0.15
Fraction II _____ 0.15–0.25
Fraction III _____ 0.25–0.42
Fraction IV _____ 0.42–0.8

Each of these catalyst fractions was added to a charge of 30% isobutene and 70% hexane and the mixture polymerized at −40° F. in the apparatus of Example 1. The following data were obtained:

| Reaction Time, min. | Approx. Diam. of AlCl₃ Part., mm. | Gms. AlCl₃ Charged | Gms. Polymer Yield | Conv. Rate | Cat. Eff. | Polymer Mol. Wt. |
|---|---|---|---|---|---|---|
| 30 | 0.15 | 2.0 | 206 | 1.64 | 206 | 24,700 |
| 30 | 0.15–0.25 | 2.0 | 56 | 0.44 | 56 | 24,500 |
| 60 | 0.25–0.42 | 2.0 | 34 | 0.14 | 17 | 24,300 |
| 60 | 0.42–0.8+ | 4.0 | 8.3 | 0.03 | 2 | 24,300 |

The above data clearly shows that aluminum chloride having a particle size less than 0.2 mm. in diameter has surprisingly greater efficiency than larger sized particles.

EXAMPLE 3

A series of experiments were carried out in which isobutylene was polymerized at temperatures from −22° F. to −94° F. with and without hexane as a diluent and in the presence of finely divided solid aluminum chloride. The following data were obtained:

| Reaction Temp., −°F. | Vol. Percent Solvent | Polymer Mol. Wt. | Percent Increase in Polymer M. W. | Occurrence of Polymer Precipitation | Degree of Fouling |
|---|---|---|---|---|---|
| 22 | 0 | 14,500 | 0 | no | moderate. |
| 22 | 25 | 19,600 | 35 | no | none. |
| 40 | 0 | 16,300 | 0 | no | moderate. |
| 40 | 25 | 19,800 | 22 | no | none. |
| 40 | 50 | 21,900 | 34 | no | Do. |
| 58 | 0 | 16,400 | 0 | yes | heavy. |
| 58 | 25 | 26,000 | 58 | no | none. |
| 76 | 0 | 17,800 | 0 | yes | heavy. |
| 76 | 25 | 30,000 | 69 | no | moderate. |
| 94 | 0 | 26,200 | 0 | yes | very heavy. |
| 94 | 25 | 35,900 | 37 | no | moderate. |

Solvent employed was Esso Hexane.

The above data show that hexane is a satisfactory polymer solvent at temperatures down to −58° F. when used in amounts as low as 25%.

EXAMPLE 4

The experiment of Example 2 was duplicated at −40° F. using petroleum ether as the solvent and the following data were obtained:

| Diluent | Vol. Percent | Polymer Mol. Wt. | Percent Increase in Polymer M. W. | Reactor Temp., °F. | Catalyst Conc. on Isobutene |
|---|---|---|---|---|---|
| None | 0 | 16,300 | 0 | −40 | 0.4 |
| Esso Hexane | 50 | 21,900 | 34 | −40 | 0.8 |
| Petroleum Ether | 50 | 25,000 | 53 | −40 | 0.8 |

The above data show that petroleum ether is an even better diluent than hexane under the conditions employed, a much higher molecular weight polymer being obtained.

EXAMPLE 5

Isobutylene was polymerized at −40° F. with solid aluminum chloride in three different batches, one with 60% hexane as diluent, another with 70% hexane as diluent and the third with 80% hexane as diluent. The polymer obtained was subjected to shear stability in oil solutions tests and the following data were obtained:

*Effect of diluent on the shear stability of polybutene*

| Wt. Percent Diluent | Wt. Percent Isobutene Reactor Liquor | Ratio Diluent to Isobutene in Reactor | Polymer Mol. Wt. (Staud.) | Shear Stability, Percent McIntyre Breakdown |
|---|---|---|---|---|
| 80 | 7 | 11.4 | 19,000 | 9.9 |
| 70 | 10 | 7.0 | 20,000 | 14.2 |
| 60 | 28 | 2.1 | 20,400 | 19.5 |

The above data indicate that the breakdown of polybutene in polybutene-oil solutions that have been subjected to high rates of shearing stress decreases with increasing diluent content or an increasing ratio of diluent concentration to unreacted olefin concentration.

EXAMPLE 6

Isobutylene was polymerized at −40° F. in a continuous process, such as that described in connection with the drawing, employing three different systems, two involving the use of isopentane diluent and a solution of aluminum bromide as the catalyst, and the third employing commercial hexane as the diluent and solid fine-divided aluminum chloride as the catalyst. The following data were obtained:

*Effect of diluent concentration and monomer concentration on the shear stability of polybutenes prepared by continuous polymerizations*

| Diluent and Catalyst | Wt. Percent Diluent in Reactor Liquor | Wt. Percent Unreacted Monomer in Reactor Liquor | Polymer M. W. (Thickening Power) | Shear Stability and McIntyre Breakdown (obs.) | Percent McIntyre Breakdown for Polymer of Same M. W. made without Solvent | Percent of Breakdown of Non-Solvent Prepared Polymers |
|---|---|---|---|---|---|---|
| Isopentane | 75.0 | 7.0 | 16,500 | 9.2 | 17.5 | 53 |
| AlBr₃ dissolved in isopentane | 80.6 | 7.0 | 18,500 | 9.9 | 22.1 | 45 |
| Isopentane | 62.8 | 20.0 | 21,400 | 17.9 | 28.8 | 62 |
| AlBr₃ dissolved in isopentane | 70.4 | 19.3 | 20,000 | 12.3 | 25.6 | 48 |
| Commercial Hexane | 70.5 | 7.0 | 18,400 | 12.5 | 21.8 | 57 |
| | 70.5 | 12.0 | 19,400 | 13.0 | 24.2 | 54 |
| Solid AlCl₃ | 70.5 | 15.0 | 22,500 | 18.4 | 31.4 | 59 |
| | 70.5 | 24.0 | 21,700 | 17.6 | 29.6 | 59 |

The above data indicate that the shear stability-molecular weight relationship for the polybutenes increases or improves with increase in the concentration of the diluent employed in the polymerization and is not affected by the olefin level present during the polymerization.

EXAMPLE 7

Additional experiments on the two systems of Example 5 are presented in the following table showing the effect of varying the level of unreacted monomer on the molecular weight.

*Effect of monomer content on the molecular weight of polybutenes prepared by continuous polymerizations*

| Catalyst | Diluent | Percent Unreacted Monomer in Reactor Liquor | Polymer Mol. Wt. (Staudinger) |
|---|---|---|---|
| AlCl₃ | Hexane | 24 | 22,500 |
| | | 15 | 21,800 |
| | | 12 | 20,700 |
| | | 7 | 17,900 |
| AlBr₃-Isopentane | Isopentane | 19 | 21,100 |
| | | 10 | 20,000 |
| | | 7 | 16,500 |

Polymerization temp., −40° F.
Diluent concentration, 70% based on polymerization liquor.

The above data show that the molecular weight of the polybutene increases rapidly with increasing olefin concentration up to about 10–12% of unreacted isobutene in the polymerization mixture. Above this olefin concentration, the molecular weight of the polymer is not markedly increased by increasing olefin concentration.

EXAMPLE 8

Isobutylene was polymerized in two batches at −40° F., using a large amount of hexane as diluent one with finely divided solid aluminum chloride, and the other with aluminum bromide dissolved in hexane. The following data were obtained:

*Comparison of molecular weight-shear stability relationship for solid AlCl₃ and AlBr₃-isopentane prepared polybutenes*

| Polymer Mol. Wt. (Thickening Power in Oil) | Percent Isopentane in Reactor Liquor | Percent McIntyre Breakdown | | |
|---|---|---|---|---|
| | | AlBr₃-Isopentane Catalyst | Solid AlCl₃ Catalyst | Difference |
| 16,500 | 75 | 9.2 | 7.7 | +1.5 |
| 20,000 | 74 | 14.2 | 12.9 | +1.3 |
| 20,000 | 70 | 12.3 | 13.5 | −1.2 |
| 13,000 | 86.5 | 3.4 | 3.5 | −0.1 |
| 18,500 | 80.6 | 9.9 | 10.5 | −0.6 |
| 21,400 | 62.8 | 17.9 | 17.5 | +0.4 |
| 19,700 | 65.2 | 19.5 | 14.1 | +5.4 |
| 19,800 | 62.5 | 20.8 | 14.5 | +5.3 |

The above data show that polybutenes prepared with solid aluminum chloride and with the dissolved aluminum bromide have approximately the same shear stability molecular weight relationship.

EXAMPLE 9

Polybutenes were prepared by polymerizing isobutylene at various temperatures and concentrations of a diluent so that a concentrate of each of the polymers in a lubricating oil, blended to a viscosity of 645 cs. at 210° F., exhibited a McIntyre shear breakdown of 15% when further diluted with a lubricating oil to shear breakdown specifications. The following data are given:

| Percent Commercial Hexane Diluent in Feed | Reaction Temp., °F. (approx.) | Polymer Mol. Wt. | Percent Polymer in Oil to give 645 cs. @ 210° F. | Percent Additional Polymer Needed Over 70% Diluent Polymer |
|---|---|---|---|---|
| 0 | −27 | 15,500 | 19.0 | 42.8 |
| 25 | −8 | 16,800 | 17.2 | 29.3 |
| 50 | −15 | 18,800 | 15.1 | 13.5 |
| 70 | −31 | 21,000 | 13.3 | |
| 85 | −58 | 23,000 | 12.1 | |

The above data show that 43% more polymer prepared in the absence of a diluent would be required than one prepared in the presence of 70% solvent to prepare an oil containing polybutene and have a 15% McIntyre shear breakdown.

EXAMPLE 10

Isobutylene was polymerized at −40° F. with finely divided solid aluminum chloride using various diluents in 50% concentration. The following data were obtained:

| Diluent | Polymer Mol. Wt. | Percent McIntyre Shear Breakdown | | Difference | Homogeneity of Reactor Liquor |
|---|---|---|---|---|---|
| | | Observed | Extrapolated for Non-Solvent Prepared Polymer | | |
| Propane | 18,200 | (1) | | | heavy precip. of polymer—2 phase. |
| Butane | 22,700 | 22.3 | 32.0 | 9.7 | heavy polymer fouling—2 phase. |
| Isopentane | 26,000 | 26.5 | 39.6 | 13.1 | no fouling—1 phase. |
| Heptane | 23,300 | 18.6 | 32.8 | 14.2 | Do. |
| Isooctane | 22,700 | 24.1 | 30.8 | 6.7 | Do. |

1 Low yield of polymer, not suitable for breakdown determination.

Solid AlCl₃ catalyst used; diluent concentration 50%.

The above data show that propane and butane are not suitable as solvents for this invention but that isopentane, heptane and iso-octane are suitable.

From the above examples it is clear that the shear stability-molecular weight relationship of polybutenes is influenced only by the concentration of the diluent and not by polymerization temperature or monomer concentration. The examples also show that the molecular weight of polybutene may be controlled by controlling any or all of the following: temperature, monomer concentration, and amount of diluent.

The nature and objects of the present invention having been thus fully set forth and specific examples of the same given, what is claimed as new and useful and desired to be secured by Letters Patent is:

1. A process for producing improved polyisobutylene which comprises polymerizing isobutylene into polyisobutylene at a temperature between about −58° F. to +104° F. with a non-complexed aluminum chloride catalyst having a particle size of less than about 0.2 mm. in the presence of about 25–95% based on total feed of an inert normally liquid $C_5$–$C_8$ alkane hydrocarbon polymer solvent until a polymer of improved shear stability and elevated molecular weight is obtained with substantially no fouling of the dissolved product by polymer precipitation.

2. Process according to claim 1 in which the amount of catalyst is between 0.01 and 2.0% by weight of the feed.

3. Process according to claim 1 in which the catalyst is dissolved in a non-complex forming, non-freezing solvent.

4. Process according to claim 3 in which the amount of catalyst is 0.005 to 1.0% by weight of the feed.

5. Process according to claim 1 in which the polymer solvent is hexane.

6. Process according to claim 1 in which the polymer solvent is commercial hexane.

7. Process according to claim 1 in which the polymer solvent is petroleum ether.

8. Process according to claim 1 in which the polymerization temperature is between about −22° F to −58° F.

9. Process according to claim 1 in which the isobutylene concentration is at least 10%.

10. Process according to claim 1 in which the polymer solvent is isopentane.

11. Process according to claim 1 in which the reaction time is at least 18 minutes, the conversion rate being at least 1 gram of polyisobutylene per gram of aluminum chloride per hour.

12. Process according to claim 1 in which the isobutylene concentration is between about 10–30%, the polymer solvent concentration being between about 70–90%.

References Cited in the file of this patent

UNITED STATES PATENTS

| | | |
|---|---|---|
| 2,400,129 | Nelson | May 14, 1946 |
| 2,681,903 | Linsk | June 22, 1954 |

OTHER REFERENCES

Powers: "Synthetic Resins and Rubbers," pages 224, 225, Wiley (1943).

Schildknecht: "Vinyl and Related Polymers," page 545, Wiley, received April 9, 1952.